United States Patent
Santi et al.

(10) Patent No.: US 7,633,020 B2
(45) Date of Patent: Dec. 15, 2009

(54) VEHICLE LOAD LIFT AND WEIGHING SYSTEM AND METHOD

(75) Inventors: Larry D. Santi, 5045 NE. 23rd St., Renton, WA (US) 98059; Richard Boyovich, Renton, WA (US)

(73) Assignee: Larry D. Santi, Renton, WA (US)

( * ) Notice: Subject to any disclaimer, the term of this patent is extended or adjusted under 35 U.S.C. 154(b) by 70 days.

(21) Appl. No.: 11/756,502

(22) Filed: May 31, 2007

(65) Prior Publication Data

US 2007/0278019 A1 Dec. 6, 2007

Related U.S. Application Data

(60) Provisional application No. 60/809,958, filed on May 31, 2006.

(51) Int. Cl.
*G01G 19/08* (2006.01)

(52) U.S. Cl. .................. 177/136; 141/21; 177/147; 177/211

(58) Field of Classification Search .............. 177/136, 177/147, 211; 414/21
See application file for complete search history.

(56) References Cited

U.S. PATENT DOCUMENTS

| | | | | | |
|---|---|---|---|---|---|
| 3,857,452 | A | * | 12/1974 | Hartman | 177/139 |
| 3,949,822 | A | * | 4/1976 | English et al. | 177/126 |
| 4,364,279 | A | * | 12/1982 | Stern et al. | 73/862.622 |
| 5,245,137 | A | * | 9/1993 | Bowman et al. | 177/139 |
| 5,703,333 | A | * | 12/1997 | Wegner | 177/139 |
| 5,837,945 | A | * | 11/1998 | Cornwell et al. | 177/136 |
| 5,861,580 | A | * | 1/1999 | Moore et al. | 177/136 |
| 5,880,409 | A | * | 3/1999 | Hartman | 177/137 |
| 6,118,083 | A | * | 9/2000 | Boyovich et al. | 177/136 |
| 6,422,800 | B1 | | 7/2002 | Reichow et al. | |

* cited by examiner

*Primary Examiner*—Randy W Gibson
(74) *Attorney, Agent, or Firm*—Seed IP Law Group PLLC

(57) ABSTRACT

A lift and weighing system comprises two lift arm assemblies directly and mechanically coupled to at least two weight-measuring devices. The system may further comprise a first elongated support member extending between and coupling to the two weight-measuring devices, and a second elongated support member interposed between and rigidly affixed on opposing sides thereof to the lift arm assemblies and/or the weight-measuring devices to protect the weight-measuring devices from side loads. The system further comprises at least two end plate adaptors respectively positioned on and rigidly attached toward opposing ends of the elongated support member and adapted to rotatably engage an external actuating system configured to operate the lift and weighing system. In another embodiment, the weight-measuring devices are housed in the elongated support member.

11 Claims, 10 Drawing Sheets

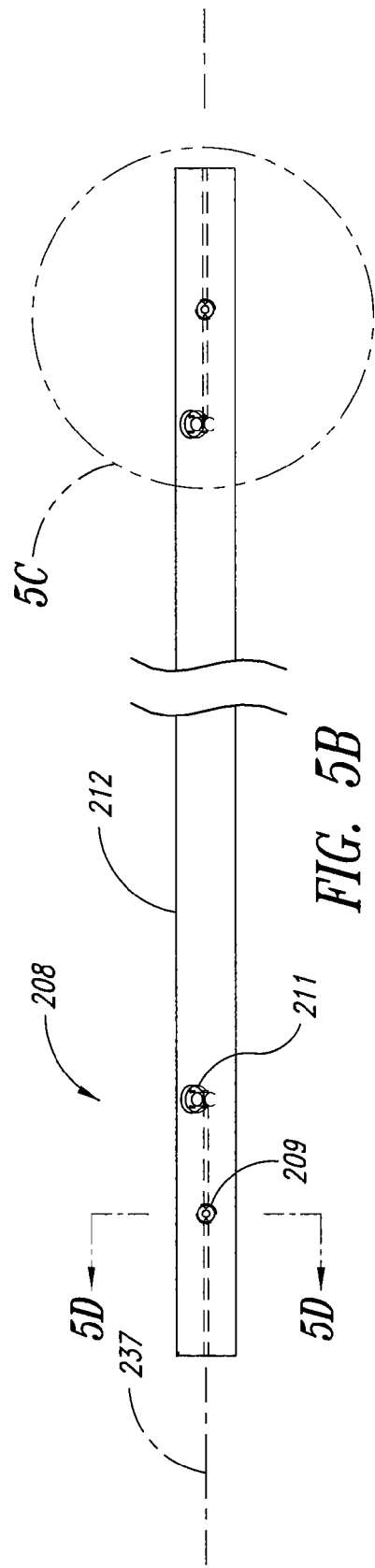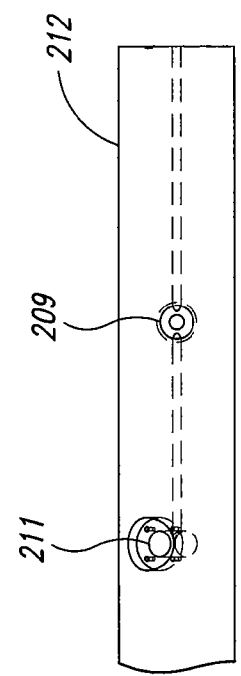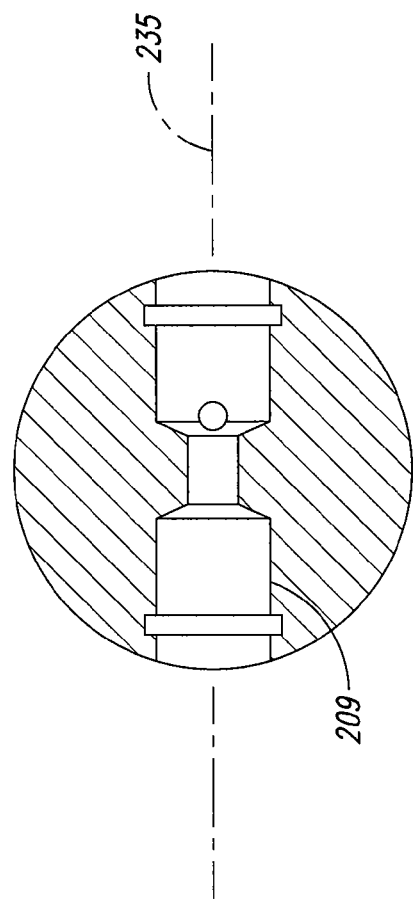

VEHICLE LOAD LIFT AND WEIGHING SYSTEM AND METHOD

CROSS-REFERENCE TO RELATED APPLICATION

This application claims the benefit under 35 U.S.C. § 119 (e) of U.S. Provisional Patent Application No. 60/809,958 filed May 31, 2006, where this provisional application is incorporated herein by reference in its entirety.

BACKGROUND

1. Field

The present invention generally relates to weighing systems, and more particularly, to a system and method for weighing loads of a lift while lifting the load.

2. Description of the Related Art

Load lift systems manufacturers and users generally monitor load weights by incorporating weight-measuring devices and/or systems. Monitoring load weights is desirable to prevent exceeding the maximum load capacity of the lift system. In certain applications, monitoring load weights is also financially desirable in instances where customers are charged based on the weight of the load being delivered, removed, or otherwise handled by the lift system. One example of such applications is refuse vehicles, for example, front load refuse vehicles. Contemporary refuse vehicles have automatic hydraulic lifts that an operator uses to lift refuse containers adapted to receive lift arms of the lift.

These lifts and the corresponding weight-measuring devices are typically either installed during manufacturing or, when being replaced, in the field. Mechanisms that receive the lift and weighing system are generally on the end of hydraulic arms of for example the front load refuse vehicle. Therefore, the lift and weighing system has to be welded on to these mechanisms, or when being replaced, the old weighing system has to be cut off and the new one welded on. Therefore, installation of the lift and weighing system is typically an arduous task, generally requiring at least one day or days of work. Installation is typically made difficult by the amount of welding required to secure the lift and weighing system, including the load cells, onto the adaptors of the hydraulically operated arms.

Past solutions have not addressed easy replacement of the weight-measuring devices and adaptability to different types and makes of vehicles. These may include retrofitting lift systems by introducing an after market weighing system and altering the lift structure, again requiring excessive down time of the vehicle and increasing costs related to replacement of the lift arms and/or the weighing system. Generally, there has not been a solution that has alleviated substantial torching, cutting, and welding of a new lift and weighing system. Therefore, conventional weighing systems continue to require cutting existing structure and/or welding on the new weighing system, typically resulting in at least one day, or in some case, days of down time.

Accordingly, there is a need for a lift and weighing system and method, that is accurate, inexpensive, easy to manufacture, can be installed and/or replaced in a very short time period, is easily adaptable to different vehicle makes and types without excessive alteration of the existing vehicle structure, and that protects weight-measuring devices thereon.

BRIEF SUMMARY

According to one embodiment, a lift and weighing system comprises a first lift arm assembly having a base coupled to an arm, a second lift arm assembly having a base coupled to an arm, a first weight-measuring device coupled to the first lift arm assembly toward the base thereof, a second weight-measuring device coupled to the second lift arm assembly toward the base thereof, and a first elongated support member having a first end and a second end, the first elongated support member being coupled toward the first end thereof to the first lift arm assembly and/or the first weight-measuring device, the first elongated support member being coupled toward the second end thereof to the second lift arm assembly and/or the second weight-measuring device. The lift and weighing system further includes a first end plate adaptor rigidly attached to and positioned adjacent at least one of the base of the first lift arm and the first weight-measuring device, the first end plate adaptor being configured to mechanically couple to a first portion of an external actuating system for imparting motion to the first end plate adaptor.

According to one aspect, the lift and weighing system further includes a second end plate adaptor rigidly attached to and positioned adjacent the base of the second lift arm assembly and/or the second weight-measuring device, the second end plate adaptor being configured to mechanically couple to a second portion of the external actuating system, opposed to the first portion, for imparting motion to the second end plate adaptor.

According to another embodiment, a lift and weighing system comprises a first lift arm assembly having a base coupled to an arm, a second lift arm assembly having a base coupled to an arm, an elongated support member having a first end and a second end, the elongated support member being coupled toward the first end thereof to the first lift arm assembly, and toward the second end thereof to the second lift arm assembly. A first weight-measuring device is at least partially positioned in the elongated support member toward the first end thereof, and a second weight-measuring device is at least partially positioned in the elongated support member toward the second end thereof. The lift and weighing system further includes a first end plate adaptor rigidly attached to the elongated support member toward the first end thereof, the first end plate adaptor being configured to be mechanically coupled to a first portion of an external actuating system for imparting motion to the first end plate adaptor, and a second end plate adaptor rigidly attached to the elongated support member toward the second end thereof, the second end plate adaptor being configured to be mechanically coupled to a second portion of an external actuating system for imparting motion to the second end plate adaptor.

According to yet another embodiment, a method for configuring a lift and weighing system for expediently mounting the lift and weighing system onto a front load refuse vehicle, comprises rigidly coupling two weight-measuring devices to an elongated support member toward opposing ends of the elongated support member, respectively, rigidly coupling two lift arms directly to two weight-measuring devices, respectively, rigidly coupling two opposing end plate adaptors to the two opposing weight-measuring device, respectively, and configuring the end plate adaptors for mechanically being coupled to opposing portions of an actuating system configured to impart motion to the two end plate adaptors, respectively.

According to still another embodiment, a method for configuring a lift and weighing system for expediently mounting the lift and weighing system onto a front load refuse vehicle, comprises installing two weight-measuring devices within opposing ends of an elongated support member, respectively, rigidly coupling two opposing end plate adaptors toward the opposing ends of the elongated support member, respectively, and configuring the end plate adaptors for being mechanically coupled to opposing portions of an external actuating system configured to impart motion to the two end plate adaptors, respectively.

BRIEF DESCRIPTION OF THE SEVERAL VIEWS OF THE DRAWING(S)

FIG. 5B is a side view of the elongated support member of FIG. 5A.

FIG. 5C is a detailed view of a portion of the elongated support member of FIG. 5B.

FIG. 5D is a cross-sectional view of a portion of the elongated support member of FIG. 5B.

DETAILED DESCRIPTION

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
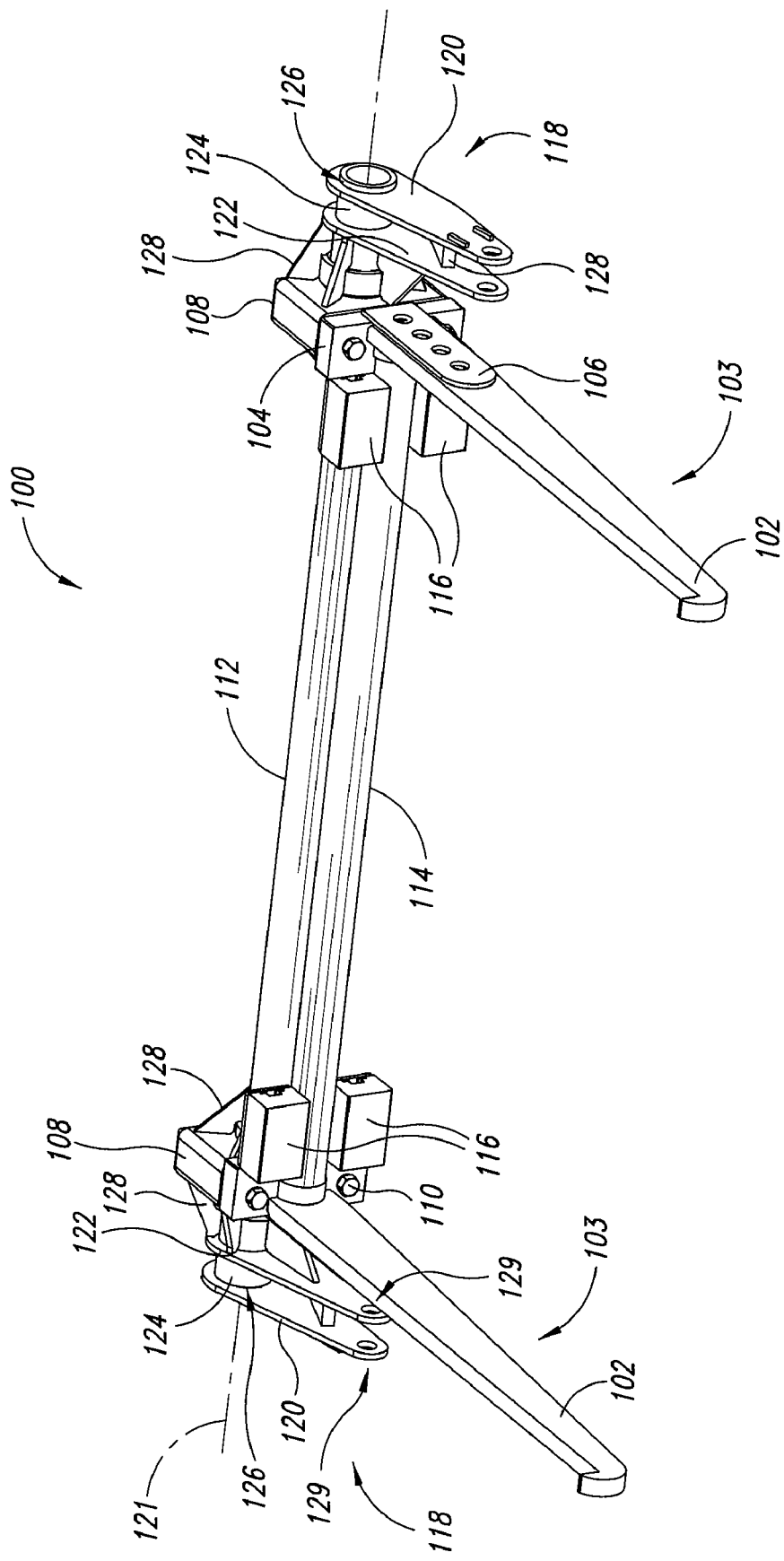
FIG. 1A is an isometric view of a lift and weighing system according to one embodiment of the present invention.

FIG. 1A illustrates a lift and weighing system 100 according to one embodiment. The lift and weighing system 100 comprises at least two lift arm assemblies 103, each having a base 104 rigidly coupled to a lift arm 102. The lift and weighing system 100 can further comprise at least one optional side brace 106 coupled to each of the two lift arms 102, respectively, to provide additional support to the lift arms 102. In embodiments in which the base 104 and the lift arm 102 are distinct parts, the side brace 106 can couple the base 104 to the lift arm 102.

The lift and weighing system 100 further includes weight-measuring devices 108, for example, two weight-measuring devices 108 adapted to rigidly couple to the base 104 via any suitable coupling means, which transfers a force exerted by a load lifted by the arm assemblies 103 to the weight-measuring devices 108, respectively. For example, the weight-measuring devices 108 can rigidly couple to the base 104 using mechanical fasteners 110, such as bolts, high strength screws, HI-LOK® fasteners, lock bolts, self locking or blind fasteners, and/or any combination thereof and/or any other suitable fastener. Alternatively, in some embodiments the weight-measuring device 108 can be welded onto the base 104 of the corresponding lift arm 102.

The weight-measuring devices 108 can be any device operable to convert a force applied, such as torsion, bending, compression, shear, and/or tension, to an indication of a weight of the load lifted by the lift arm assemblies 103, which is exerting the force. For example, the weight-measuring device 108 can be a pin, beam, button, or plate load cell. An interaction between the lift arm assemblies 103 and the weight-measuring devices 108 is described in more detail below in conjunction with FIG. 3.

The lift and weighing system 100 further comprises a first elongated support member 112 extending between and rigidly coupling to the weight-measuring devices 108. The first elongated support member 112 can rigidly attach to the weight-measuring devices 108 and/or the lift arm assemblies 103 toward opposing ends of the first elongated support member 112. For example, the first elongated support member 112 can attach to an inner surface of the weight-measuring device 108 and/or the lift arms 102. The first elongated support member 112 secures the respective weight-measuring devices 108 and the lift arm assemblies 103 in a position in which the lift arms 102 are suitably spaced depending on the application. For example, the lift arm assemblies 103 may be spaced by a distance substantially identical to a distance between slots in a standard refuse container configured to receive the lift arms 102 for lifting the container. The first elongated support member 112 comprises a longitudinal axis 121, which extends in a direction that is not parallel to the lift arms 102, for example, in a direction substantially perpendicular to the lift arms 102.

The lift and weighing system 100 may further include a second elongated support member 114, also extending between and rigidly coupling to an inner side of the weight-measuring devices 108 and/or the lift arm assemblies 103. The second elongated support member 114 can be positioned to protect the weight-measuring devices 108 from loads and obstacles and/or objects, for example from side loads. In case of a refuse vehicle, such as a front load refuse vehicle, the second elongated support member 114 can be positioned to protect the weight-measuring devices 108 from objects that may eject from a refuse container being lifted by the lift and weighing system 100.

The first and second elongated support members 112, 114 may respectively comprise any solid or tubular cross-sectional shape such as rectangular, circular, elliptical, or any other shape. The first and second elongated support members 112, 114 may be fabricated from metals such as steel, titanium, and aluminum, different types of woods, hard plastics, composites such as carbon fiber, any combination thereof and/or any other material capable of maintaining one of the weight-measuring devices 108 and the lift arm assemblies 103 spaced from the other of the weight-measuring devices 108 and the lift arm assemblies 103, while resisting lateral and/or other loads and stresses that may be exerted directly on or transferred indirectly to the first and second elongated support members 112, 114.

To further protect components of the lift and weighing system 100, the system 100 comprises protective members 116. The protective members 116 can be fabricated from a resilient material, for example, plastics, silicone, natural and/or synthetic rubbers, polyurethanes, other foams, resilient composites, or any combination thereof, and/or any material that can resist an impact and/or temporarily deform in response to a force or impact and thereafter resume its original shape. Additionally, or alternatively, the protective members 116 may be fabricated from other materials, such as metals, woods, other composites, hard plastics, or any other material capable of obstructing objects from contacting components of the system 100, such as the weight-measuring devices 108.

Figure 2:
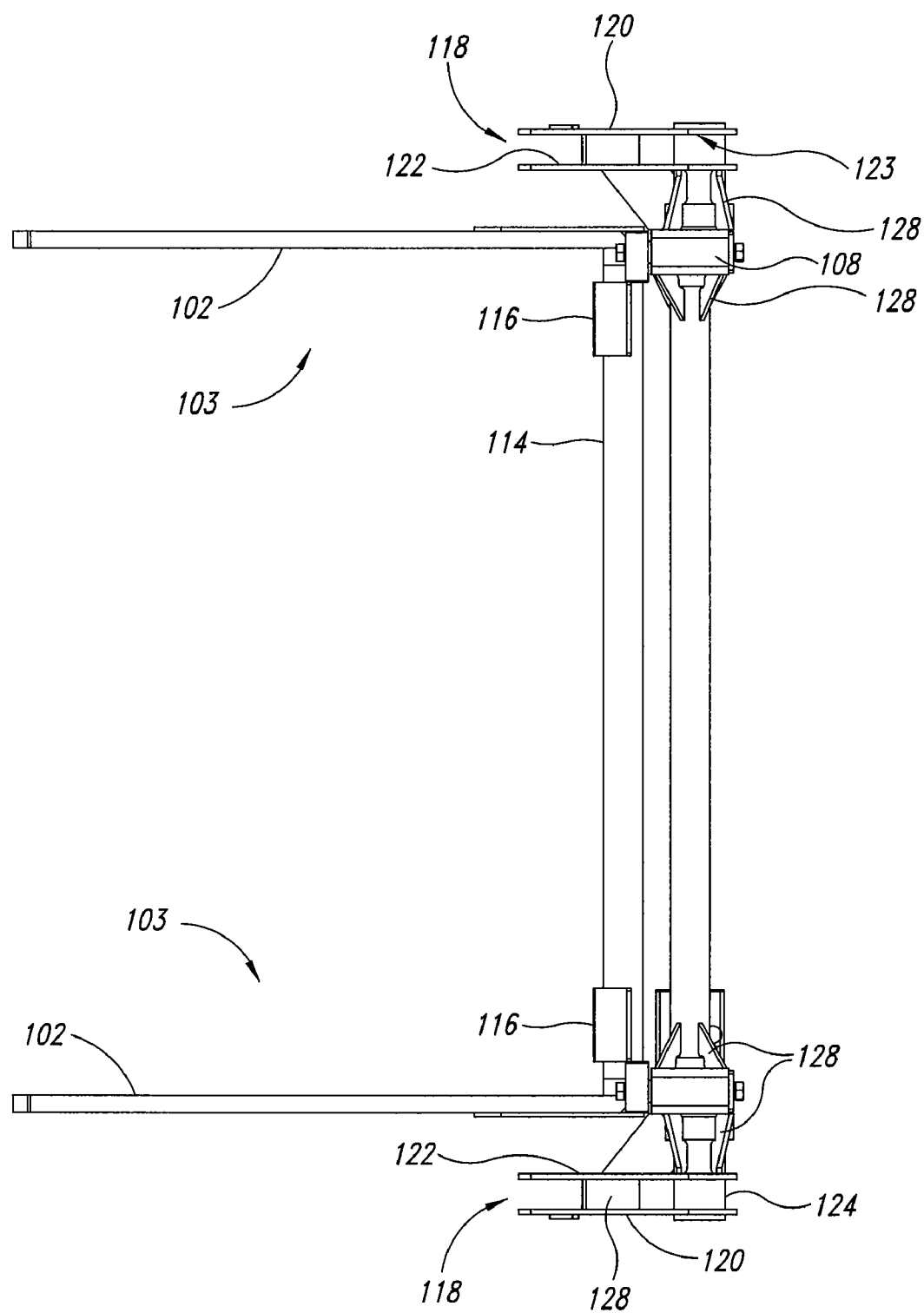
FIG. 2 is a plan view of the lift and weighing system of FIG. 1A.

As illustrated in FIG. 2, the second elongated support member 114 and the protective members 116 are positioned between the lift arms 102 and the weight-measuring devices 108. Accordingly, the second elongated support member 114 and the protective members 116 minimize a chance of impact damage to the weight-measuring devices 108 from containers lifted by the respective lift arms 102 and/or objects that may inadvertently eject from the refuse container and plummet toward the weight-measuring devices 108.

Figure 1B:
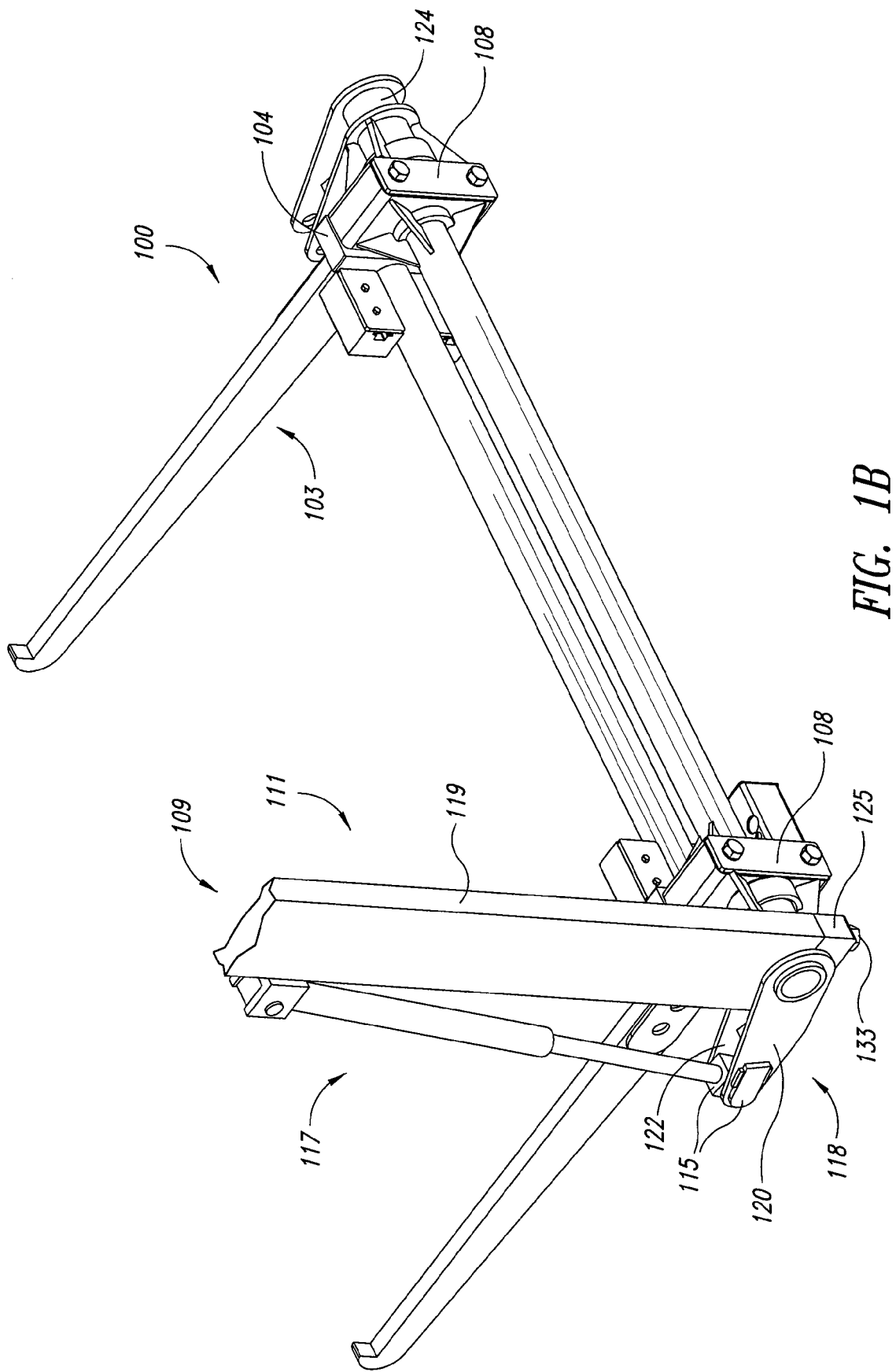
FIG. 1B is an isometric view of the lift and weighing system of FIG. 1A coupled to an external actuating system.

As illustrated in FIGS. 1A, 1B, and 2, the lift and weighing system 100 also comprises end plate adaptors 118, each positioned proximate or adjacent the weight-measuring devices 108 and/or the base 104 of the lift arm assemblies 103. For example, the end plate adaptors 118 can be positioned toward an outer surface of each of the weight-measuring devices 108 and the lift arm assemblies 103, opposed to the inner surface. The end plate adaptors 118 are configured to mechanically couple to opposing hydraulically operated arms 111 (FIG. 1B) of an external actuating system 109 (FIG. 1B), such as an actuating system of a refuse vehicle. FIG. 1A illustrates one portion of the external actuating system 109 for clarity of illustration and the opposing portion (not shown) is substantially identical and mirrors the portion of the actuating system 109 that is shown.

The illustrated actuating system 109 is provided for a thorough understanding of an interaction of the lift an weighing system 100 with the external actuating system 109; however, one of ordinary skill in the art will appreciate that the actuating system 109 may include different configurations for different applications and the end plate adaptors 118 may vary in configuration for coupling to actuating systems 109 having different coupling structures.

For example, in one embodiment, each end plate adaptor 118 may comprise at least one outer plate 120 and at least one inner plate 122, spaced with respect to each other via a pin 124. The pin 124 can be secured in an opening 126 (FIG. 1A) in the outer and inner plates 120, 122, respectively. The pins 124 extend through the openings 126 and rigidly couple to a housing 127 (FIG. 3) of the weight-measuring devices 108 by any suitable method such as by welding, fastening, or via an adaptor or any other suitable attachment or coupling structure. Therefore, the end plate adaptors 118 are rigidly attached to the remainder of the system 100.

In some embodiments, the outer plates 122 are not fabricated with the opening 126 and the first pin 124 can weld or otherwise rigidly attach to respective inner surfaces 123 (FIG. 2) of the outer plates 122 toward a first end of the pins 124.

The end plate adaptors 118 serve as an interface between the lift and weighing system 100 and the external actuating mechanism 109 for imparting motion to the system 100. For example, in the case of a front load refuse vehicle, the hydraulically operated arms 111 of the actuating system 109, and/or other moveable frame that is mounted on the vehicle, mechanically secure onto or couple to the end plate adaptors 118, for example, to the pins 124. The hydraulically operated arms 111 can rotatably couple to the pins 124 by having an opening toward an end thereof, which rotatably engages a circumference of the pins 124, for example via a first portion 119 and a second portion 125 of the respective hydraulically operated arms 111.

Figure 1C:
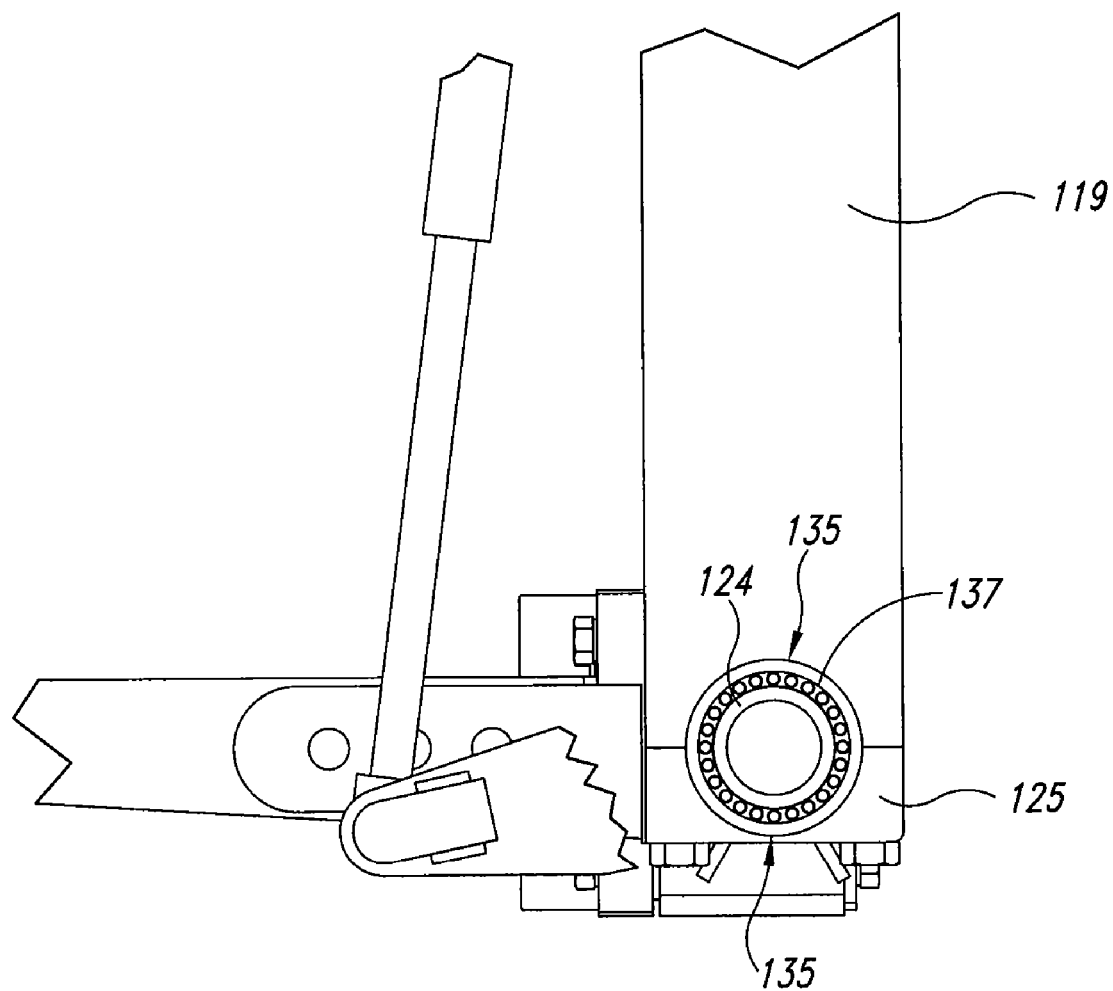
FIG. 1C is a side view of a portion of the lift and weighing system of FIG. 1A according to one aspect.

The first and second portions 119, 125 each include a concavity 135 (FIG. 1C) toward a terminal end thereof, which at least partially circumscribes or surrounds an outer perimeter of the pin 124. The first and second portions 119, 125 can be mechanically coupled to each other, for example by using mechanical fasteners 133. Further, a bearing member 137 (FIG. 1C) can be positioned between the respective concavities 135 and the pin 124. In some embodiments the pin 124 may be an extension of the first or second elongated support members 112, 114. In some embodiments, the second portion 125 may be a coupling block 125 that is rigidly attached to a portion of the bearing member 137 and forms a portion of the respective end plate adaptors 118. In such an embodiment, the hydraulically operated arms 111 each include only the first portion 119 and the coupling block 125 can be mechanically coupled to the first portion 119 to install the lift and weighing system 100 to the actuating system 109.

One of ordinary skill in the art can appreciate that other suitable configurations for rotatably coupling the end plate adaptors 118 to the hydraulically operated arms 109 are possible. For example, the pin 124 may be rotatably coupled to the outer and inner plates 120, 122, for example via two bearing members, each positioned between the pin and the respective openings 126 in the outer and inner plates 120, 122. Further, the first and second portions 119, 125 of the hydraulically operated arms 111 can be tightly fastened to fixedly couple the hydraulically operated arms 111 to the pins 124, respectively. Other configurations are possible.

The inner and outer plates 120, 122 of the end plate adaptors 118 each further comprise a second opening 129 (FIG. 1A), which is configured to rotatably engage or couple to a coupling structure 115 (FIG. 1B) of a retractable cylinder 117 (FIG. 1B) of the actuating system 109, which is typically positioned on, or coupled to, the hydraulically operated arms 111 and is operable to pivot the end plate adaptors 118 and the system 100 about the pins 124 to rotate the lift arms 102. During operation, the lift arms 102 engage corresponding refuse container slots (not shown) to lift the container and deposit a content of the container in a refuse space of the vehicle or any other desired location.

Typically, a relative motion of the retractable cylinder 117 with respect to the hydraulically operated arms 111 imparts the motion onto the end plate adaptors 118. For example, the retractable cylinder 117 can be spaced from the corresponding hydraulically operated arm 111, at least a portion the retractable cylinder 117 translating with the respect to the hydraulically operated arm 111 for rotating the end plate adaptors 118 and the system 100. As the system 100 rotates, the lift arms 102 rotate the lifted container to empty the container when raised to an appropriate position.

One of ordinary skill in the art will appreciate that the end plate adaptors 118 may each comprise a second pin that is configured to rotatably couple to the retractable cylinder 117 in a similar manner as that discussed above with respect to the first pins 124 and the hydraulically operated arms 111. The second pin can be rigidly attached to the second openings 129 and configured to rotatably couple to the retractable cylinder 117. Alternatively, the pins 124 may rotatably engage the second openings 129, for example through use of bearings, and be configured to rigidly engage or couple to the retractable cylinder 117.

Since the end plate adaptors 118 are rigidly attached to the lift and weighing system 100, for example to the housing 127 of the weight-measuring device 108 or the lift arm assemblies 103, the rotation of the end plate adaptors 118 rotates the entire system 100. The orientation and/or positioning of the pins 124 with respect to the second openings 129 can be predetermined to ensure that the container being lifted rotates an optimum degree to prevent under-rotation and/or over-rotation of the lift and weighing system 100.

Conventional systems have rotation mechanisms that are typically on hydraulic arms, for example, hydraulic arms of the front load refuse vehicles; therefore, conventional lift and weighing systems have to be welded on to engage these mechanisms. In contrast, the lift and weighing system 100 according to an embodiment of the present invention includes end plate adaptors 118, which allows users and manufacturers to easily remove the old system and adaptors and bolt on, or otherwise mechanically couple, the lift and weighing system 100 utilizing the end plate adaptors 118 to substantially alleviate time consuming and expensive processes such as cutting, torching or welding.

Since the end plate adaptors 118 are integral to the system 100, when the system 100 is being installed onto new vehicles or when an old lift and weighing system is being replaced with the lift and weighing system 100 according to an embodiment of the present invention, the manufacturer or user mechanically couples the end plate adaptors 118 to the actuating system 109 of the vehicle such that the hydraulically operated arms 111 properly engage the end plate adaptor pins 124 and the retractable cylinders 117 engage the second openings 129 depicted in FIG. 1A, as described above. Therefore, there is no need to modify the vehicle arm structure and/or to weld in place the replacement lift and weighing system. Accordingly, a duration of time necessary to install the lift and weighing system 100 is reduced from more than one day to less than a few hours, and in some cases to less than one hour, as compared to the installation of conventional systems. The configuration of the openings and pins in the end plate adaptors 118 may vary depending on the make and type of the refuse vehicle.

The end plate adaptors 118 and components thereof such as the pins 124 may be fabricated from metals such as steel, titanium and aluminum, composites such as carbon fiber, or any other material strong enough to transfer loads and stresses associated with the system 100, the refuse container and contents of the container to the frame of the vehicle or any other structure to which the system 100 is coupled to perform a load lifting task. The pins 126 may comprise any cross sectional shape, such as circular or rectangular, which may further be solid or tubular. The system 100 may comprise optional stiffeners 128 in regions of high stress such as an interface between the end plate adaptors 118 and the weight-measuring devices 108 and/or the lift arm assemblies 103, or between the first and second plates 120, 122.

Figure 3:
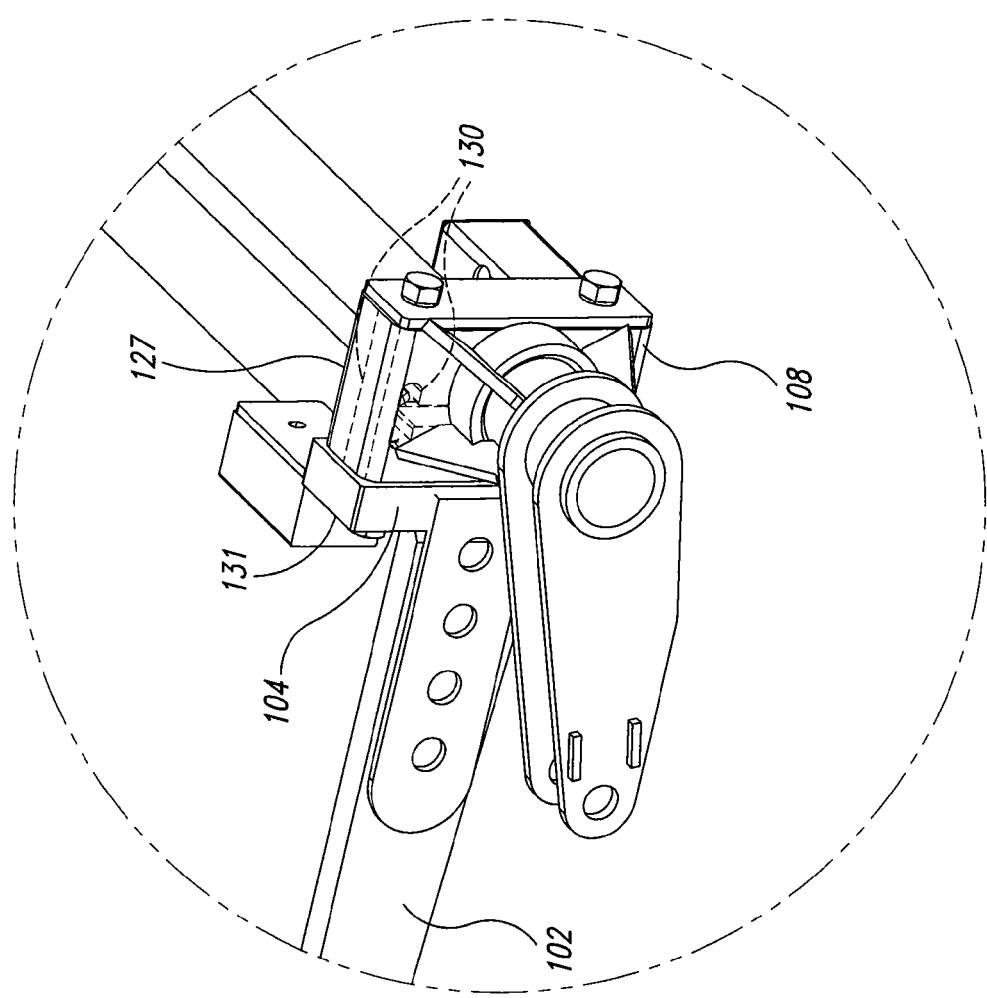
FIG. 3 is an isometric view of a portion of the lift and weighing system of FIG. 1A.

The housing 127 of the weight-measuring device 108 is transparent in FIG. 3 to illustrate an example embodiment in which the weight-measuring device 108 includes a differential bending load cell 130, which is contained in the housing 127. In one embodiment, each base 104 includes a mounting plate 131 that is coupled to the lift arm 102. The mounting plate 131 is mechanically fastened to the weight-measuring device 108 with mechanical fasteners that extend through the mounting plate 131, the housing 127, and the differential bending load cell 130, such that the weight of the load lifted by the lift arms 102 is transferred through the mechanical fasteners to the differential bending load cells 130. The differential bending load cells 130 are configured to measure and communicate this weight as is known in the art.

From the foregoing it can be appreciated that in operation, when the lift and weighing system 100 lifts a load, such as a refuse container, an accurate measure of a weight of the load can be measured. The accuracy of the measurement of the weight depends on a positioning of the lift and weighing system 100 with respect to a direction along which gravity acts on the load, and the type of weight-measuring device used. In the illustrated embodiment of FIG. 3, the weight-measuring device 108 is a differential bending load cell. When a differential bending load cell is used, the weight of the load is most accurately measured when the direction of gravity on the load is substantially perpendicular to the lift arms 102 to induce a moment on the weight-measuring device 108 and receive an accurate measure of the weight.

Alternatively, in embodiments where a shear pin load cell is used, it is preferred that the weight be measured when the system 100 is positioned such that the direction of gravity acting on the load is substantially induces only shear loads on the load cell. Other configurations are possible. Minor deviations in such positioning typically result in negligible variations in the measurement of the weight.

It has been shown that installing a system according to an embodiment of the present invention can be accomplished in less than an hour, whereas, installation of conventional system requires at least one day or days of work. Furthermore, the appropriate orientation of the lift arm assemblies 103 with respect to the weight-measuring devices 108 alleviates the need for additional systems to account for errors in measuring the weight.

Figure 4:
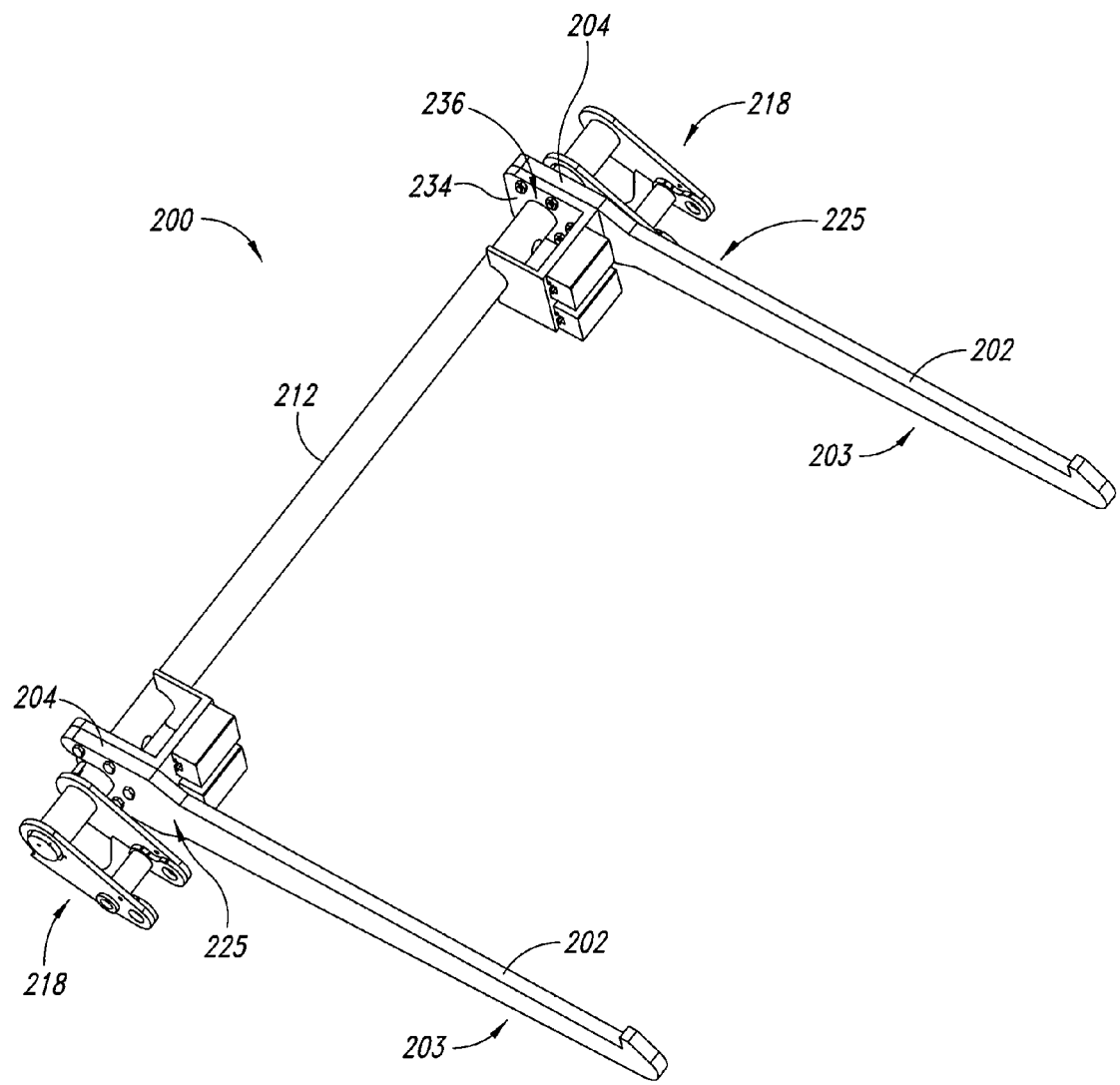
FIG. 4 is an isometric view of a lift and weighing system according to another embodiment of the present invention.
Figure 5A:
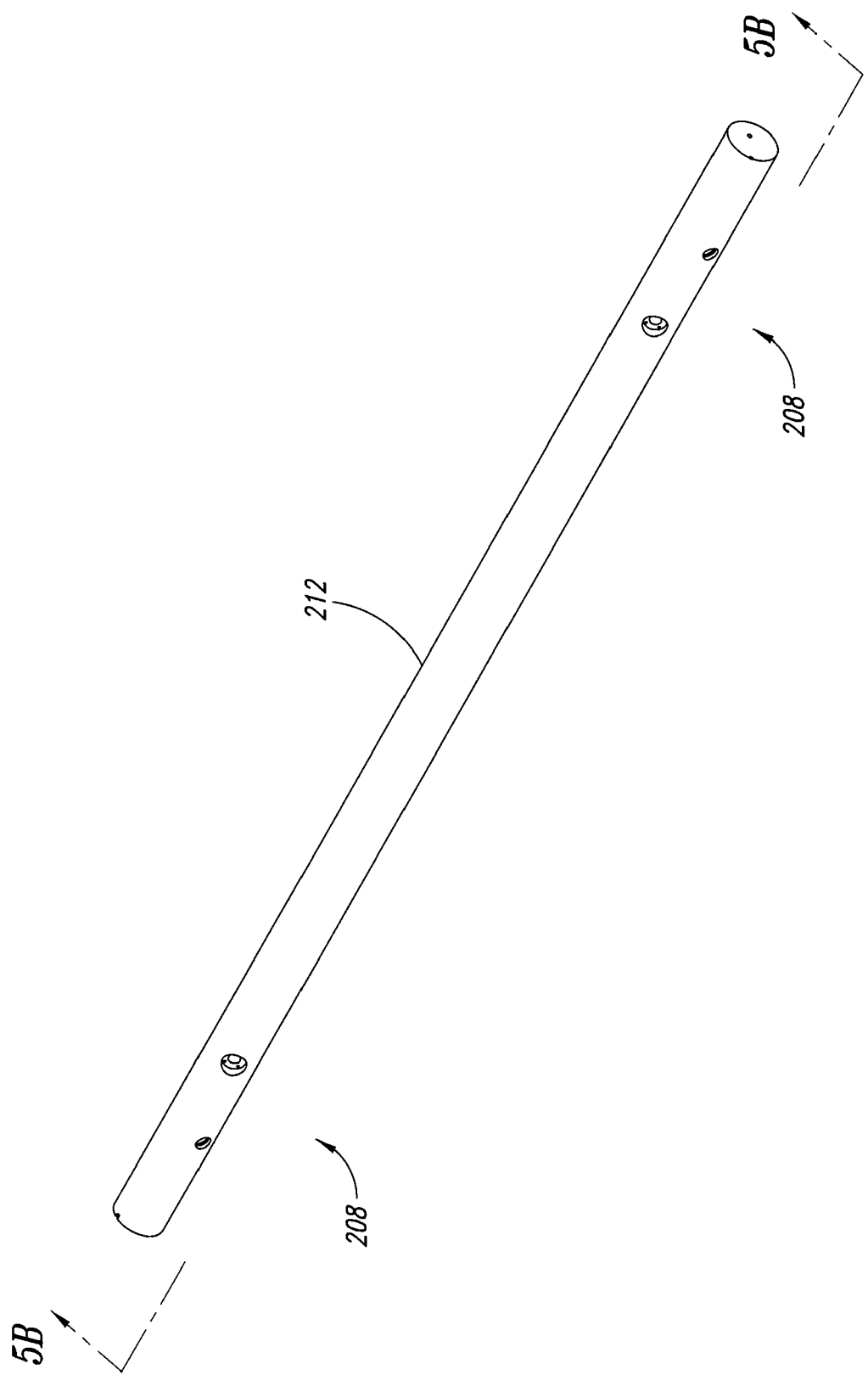
FIG. 5A is an isometric view of an elongated support member of the lift and weighting system of FIG. 4.

In another embodiment as illustrated in FIG. 4, a lift and weighing system 200 comprises two lift arm assemblies 203 each comprising a base 204 and a lift arm 202. The lift arm assemblies 203 are rigidly coupled to an elongated support member 212 toward opposing ends of the elongated support member 212. The elongated support member 212 houses at least one weight-measuring device 208 (FIGS. 5A-5D). The system 200 also includes two end plate adaptors 218 rigidly coupled to the elongated support member 212 toward opposing ends of the elongated support member 212 and positioned proximate and/or adjacent an outer surface 225 of the lift arm assemblies 203 toward the base 204. In one embodiment, the elongated support member 212 includes two weight-measuring devices 208 that are positioned at least partially within the elongated support member 212 toward opposing ends thereof, as illustrated in FIGS. 5A and 5B.

Furthermore, as illustrated in the detail view of FIG. 5C, the weight-measuring devices 208 respectively include a weight-measuring portion 209 electrically coupled to an electronic communicating device 211 configured to communicate an indication of a weight measured by the weight-measuring portion 209, for example, to a display device (not shown) inside a cabin of the vehicle.

Figure 6:
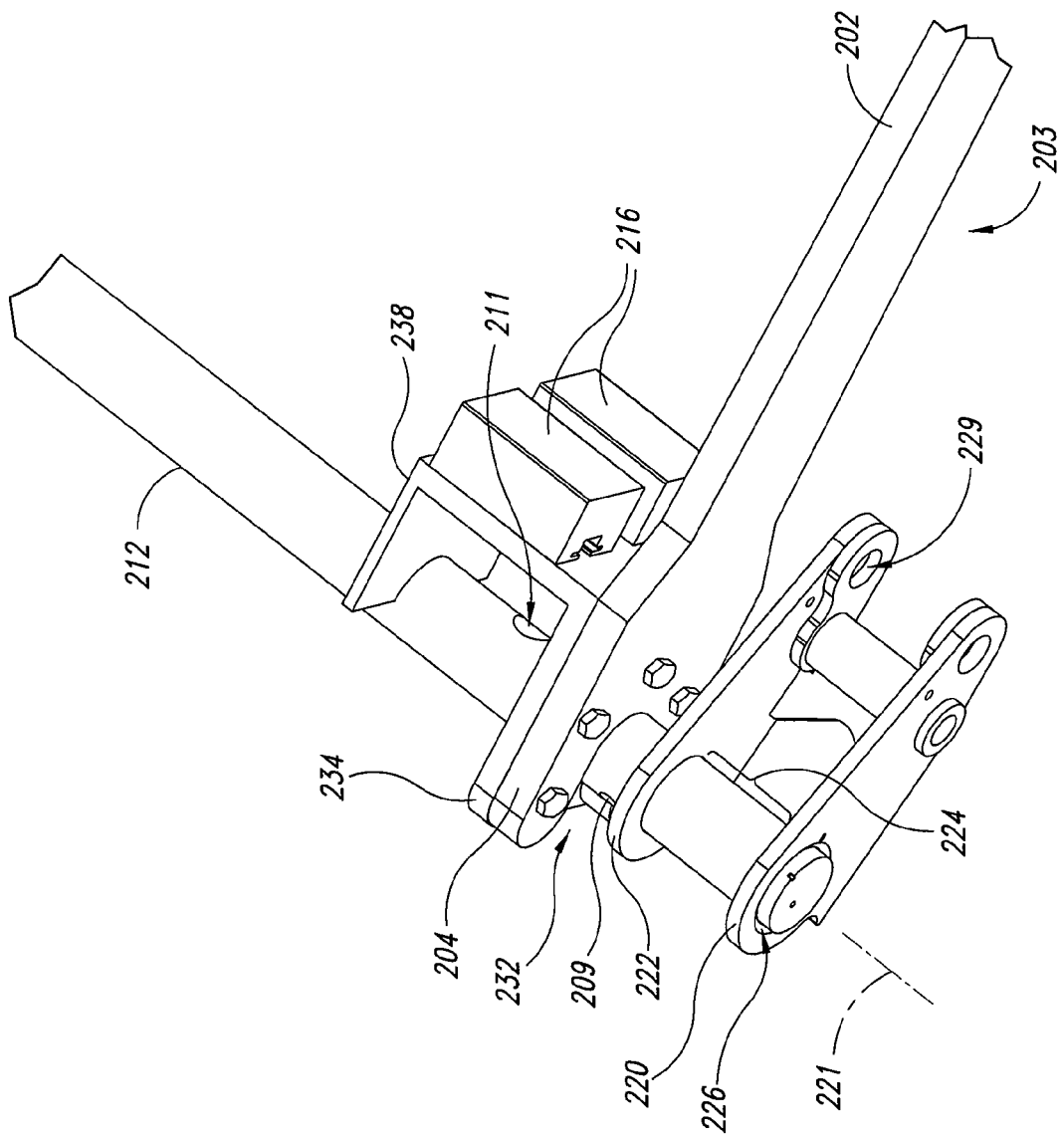
FIG. 6 is an isometric view of a portion of the lift and weighing system of FIG. 4.

As illustrated in FIG. 6, the lift arm assemblies 203 respectively couple toward their base 204 to the elongated support member 212 at a location proximate and/or adjacent the weight-measuring portion 209 for transferring a weight of a load toward the weight-measuring portion 209 when the load is lifted by the lift arms 202. Furthermore, the end plate adaptors 218 may each comprise a first plate 220 and a second plate 222, each having a first opening 226 configured to receive and rigidly couple to the elongated support member 212. In one embodiment, the elongated support member 212 extends through the first openings 226 toward a corresponding end of the elongated support member 212. A portion 224 of the elongated support member 212 positioned between the first and the second plates 220, 222 is configured to rotatably couple to the hydraulically operated arm 111 (FIG. 1B) of the external actuating system 109 (FIG. 1B) of the vehicle.

Furthermore, the end plate adaptors 218 include a coupling structure 229 for rotatably coupling to the retractable cylinder 117 (FIG. 1B) of the external actuating system 109 of the vehicle, which is typically mounted on the hydraulically operated arm 111. In one embodiment as illustrated in FIG. 6, the coupling structure 229 comprises a second opening formed in the first and the second plates 220, 222. The second openings are configured to rotatably couple to the corresponding retractable cylinder 117 using the coupling structure 115, which can include a rotating pin, a bearing member, and/or a pin, bearing and retainer combination (FIG. 1B). At least a portion of the retractable cylinder 117 is generally configured to translate with respect to the hydraulically operated arm 111 and upon translation thereof, the end plate adaptors 218 pivot about a longitudinal axis 221 of the elongated support member 212.

In the illustrated embodiment of FIGS. 5A-5D, the weight-measuring device 208 is a shear pin load cell. In this embodiment, the weight of the load is preferably measured when a hydraulic actuating system 109 lifts the system 200 to a position in which the direction of gravity acting on the load, or a center of gravity thereof, induces the shear pin load cells to experience substantially purely shear stresses. One of ordinary skill in the art will appreciate that in this position, the weight-measuring portion 209 experiences the weight of the load substantially unaffected by a moment arm. In one embodiment illustrated in FIGS. 5B, 5C and 5D, the shear pin load cell is substantially cylindrical and extends longitudinally along a first axis 235. The first axis 235 extends in a direction substantially perpendicular to a second axis 237 along which the support member 212 extends.

Figure 7:
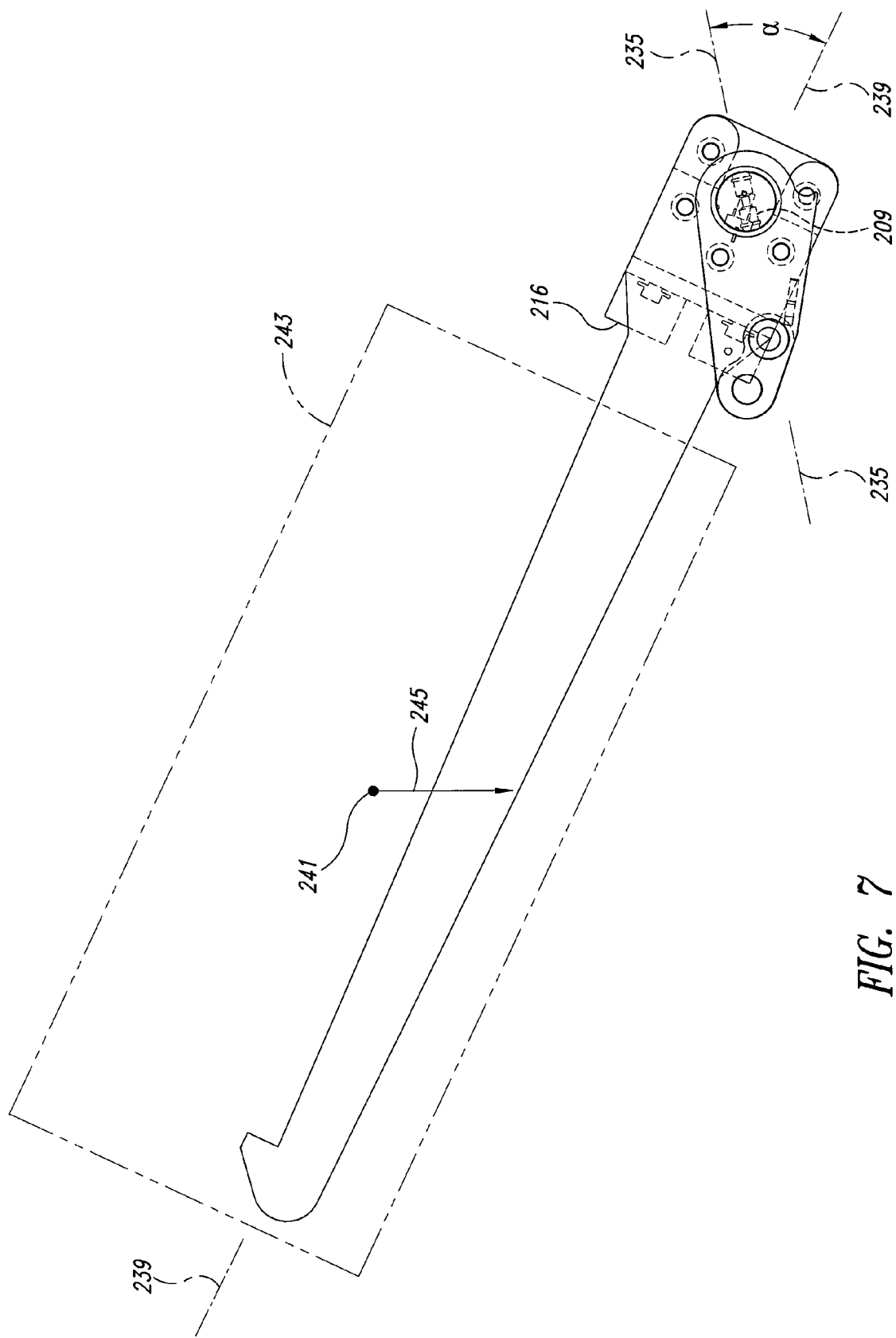
FIG. 7 is a side view of the lift and weighing system of FIG. 4.

Furthermore, as illustrated in FIG. 7, the lift arms 202 generally extend along a third axis 239. In this embodiment, the shear pin load cell 209 is oriented such that the first axis 235 (i.e., the shear pin longitudinal axis) forms an angle α having a first magnitude, for example an approximately 45-degree angle, with respect to the third axis 239. Accordingly, in this embodiment, the weight of the load lifted by the lift arms 202 is most accurately measured when the load is lifted to a position in which the lift arms 202 form an angle having a substantially identical magnitude as the magnitude of the angle α, for example a 45-degree angle, with a horizontal or level surface (i.e., a surface, which is not at an incline or a decline), such as a level surface or ground on which the refuse vehicle rests. In this position, gravity acts on a center of gravity 241 of the load 243 in a direction 245 that is substantially perpendicular to the first axis 235. Although the center of gravity 241 may be spaced from the shear pin load cell 209 and some bending may occur, effects of such bending on the accuracy of weight measurement has been shown to be negligible.

Although the above description provides one example for the weight-measuring device 208, in other embodiments, other types of weight-measuring devices can be used.

Furthermore, the lift arm assemblies 203 may couple to the elongated support member 212 via any suitable means. For example, in the embodiment illustrated in FIG. 6, the base 204 forms a U-shaped opening 232 in which at least a portion of the elongated support member 212 nests. The base 204 is mechanically fastened adjacent a periphery of the U-shaped opening 232 to a plate 234 comprising an opening 236 (FIG. 4) through which the elongated support member 212 extends. The elongated support member 212 is rigidly attached to the plate 234 at an interface between the elongated support member 212 and the opening 236 in the plate 234. Alternatively, instead of the U-shaped opening 232, the base 204 may comprise a circular opening through which the elongated support member 212 extends, rigidly coupling to the lift arm assemblies 203 at an interface between the elongated support member 212 and the circular opening.

Furthermore, in some embodiments, the plate 234 may form one flange of a protective fitting 238 configured to protect the electronic communicating device 211 from impact by foreign objects such as objects ejecting from a refuse container that is lifted by the lift arms 202. The system 200 may comprise additional optional protective members 216 to further reduce a chance of impact damage to the electronic communicating device 211. The protective members 216 may be fabricated from a resilient material, for example, plastics, silicone, natural and/or synthetic rubbers, polyurethanes, other foams and resilient composites, any combination thereof and/or any material that can resist an impact and/or temporarily deform in response to a force or impact and thereafter resume its original shape. Additionally, or alternatively, the protective members 216 may be fabricated from other materials, such as metals, woods, other composites, hard plastics, or any other material capable of protecting the electronic communicating device 211 from impact by foreign objects.

From the foregoing it can be appreciated that the elongated support member 212 housing the weight-measuring devices 208 alleviates the need for additional structure for protecting components of the weight-measuring device 208 which are not exposed to impact by foreign objects. For example, as shown in FIG. 6, the weight-measuring portion 209 of each weight-measuring device 208 is shielded from impact by foreign objects. Therefore, in this embodiment, a separate housing for the weight-measuring device 208 and additional elongated support members can be eliminated, resulting in easier, faster, and less expensive manufacturing of the system 200, which is also lighter than systems which require these additional structures.

Although use of the present invention has been discussed in context of certain applications, such as refuse vehicles, it is understood that the present invention can be used in an array of applications where at least one arm of a lift system lifts a load to move it elsewhere or deposit the contents thereof in a receptacle or a second container.

It is also understood that the weight-measuring devices can be electrically coupled to a decoder operable to combine signals and calculate the weight of the load being lifted. The decoder can in turn be electrically coupled to a display device, which for example may be located inside the cabin of the refuse vehicle to communicate and display the weight of the load being lifted by the lift and weighing system.

In addition, a software option can be incorporated, such as a "Geo-Fencing" software option that allows the user to detect customer accounts and load manipulation/disposal patterns and weights automatically. The software can be electrically coupled to the lift and weighing system 100 and can record information communicated via the lift and weighing system 100, such as the Global Positioning System (GPS) coordinates of the load location at the time the load is picked up. These coordinates are delivered to the software, which can be linked to a computing device used to automatically detect the account by drawing a Geo-Fence around the coordinates.

Therefore, the software can identify the account by the fact that the pickup coordinates are into one of the Geo-Fences in a database that has previously been measured and configured. In this manner, refuse disposal companies and other businesses who charge clients based on a weight of a load that is picked up from the client's or other location, can charge their customers based on the weight of the loads manipulated by the lift and weighing system.

The various embodiments described above can be combined to provide further embodiments. All of the U.S. patents, U.S. patent application publications, U.S. patent applications, foreign patents, foreign patent applications and nonpatent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A lift and weighing system configured to measure a weight of an external object, comprising:
   a first lift arm assembly having a base coupled to an arm;
   a second lift arm assembly having a base coupled to an arm;
   an elongated support member having a first end, a second end, and a body extending between the first end and the second, the elongated support member being coupled toward the first end thereof to the first lift arm assembly, and toward the second end thereof to the second lift arm assembly;
   a first weight-measuring device at least partially positioned within the body of the elongated support member toward the first end thereof; and
   a second weight-measuring device at least partially positioned within the body of the elongated support member toward the second end thereof.

2. The lift and weighing system of claim 1 wherein the first and second lift arm assemblies each include an inner surface and an outer surface, opposed to the inner surface, the first and second weight-measuring devices being positioned toward the inner surface of the first and second lift arm assemblies, respectively, the first and second end plate adaptors being positioned toward the outer surface of the first and second lift arm assemblies, respectively.

3. The lift and weighing system of claim 1 wherein the first and second end plate adaptors each include an inner plate, an outer plate, a first opening, and a second opening, the elongated support member extending through the first opening of the inner and outer plates, a portion of the elongated support member between the first and second openings forming a pin portion configured to be rotatably coupled to a hydraulically operated arm of the external actuating system, and the second opening being configured to be rotatably coupled to a retractable cylinder of the hydraulically operated arm, a translation of the retractable cylinder with respect to the hydraulically operated arm rotating the lift and weighing system about an axis substantially parallel to a direction along which the elongated support member extends.

4. The lift and weighing system of claim 3, further comprising:
   a bearing member rotatably coupled about a perimeter of the pin portion, wherein the first and second end plate adaptors each further comprise a coupling block having a concavity, the concavity being rigidly attached to a portion of a perimeter of the bearing member, a remainder of the perimeter of the bearing member being configured to nest in a concavity of the hydraulically operated arm, the coupling block being configured to mechanically couple to the hydraulically operated arm on opposing sides of the pin for rotatably coupling the pin to the hydraulically operated arm.

5. The lift and weighing system of claim 1 wherein the first and second weight-measuring devices each include a shear pin load cell in electronic communication with a communicating device operable to convey an indication of a weight of a load lifted by the lift and weighing system.

6. The lift and weighing system of claim 5 wherein the shear pin load cell is oriented such that a longitudinal axis thereof forms an approximately 45-degree angle with respect to a longitudinal axis of one of the first and second lift arms.

7. The lift and weighing system of claim 1, further comprising:
   a first fitting having a first flange including an opening rigidly attached to the elongated support member toward the first end thereof, the base of the first lift arm assembly being coupled to the first flange of the first fitting, the base having a concavity, at least a portion of the elongated support member nesting in at least a portion of the concavity; and
   a second fitting having a first flange including an opening rigidly attached to the elongated support member toward the second end thereof, the base of the second lift arm assembly being coupled to the second fitting, the base having a concavity, at least a portion of the elongated support member nesting in at least a portion of the concavity.

8. The lift and weighing system of claim 1 wherein at least one of the first and second weight-measuring devices includes a shear pin having a shear pin axis, the shear pin axis extending at an angle with respect to an axis of the elongated support member.

9. The lift and weighing system of claim 7, further comprising:
   at least one resilient protective member mounted on at least one of the first and second fittings.

10. A method of making a lift and weighing system according to claim 1, the method comprising:
    coupling a first base to a first arm to form a first lift arm assembly;
    coupling a second base to a second arm to form a second lift arm assembly;
    installing a first weight-measuring device at least partially within a body of an elongated support member toward a first end of the elongated support member;
    installing a second weight-measuring device at least partially within the body of the elongated support member toward a second end of the elongated support member;
    coupling the elongated support member to the first lift arm assembly toward the first end of the elongated support member; and
    coupling the elongated support member to the second lift arm assembly toward the second end of the elongated support member.

11. The lift and weighing system of claim 1, further comprising:
    a first end plate adaptor rigidly attached to the elongated support member toward the first end thereof, the first end plate adaptor being configured to be coupled to a first portion of an external actuating system for imparting motion to the first end plate adaptor; and
    a second end plate adaptor rigidly attached to the elongated support member toward the second end thereof, the second end plate adaptor being configured to be coupled to a second portion of an external actuating system for imparting motion to the second end plate adaptor.

* * * * *